(12) United States Patent
Lee

(10) Patent No.: US 12,543,894 B2
(45) Date of Patent: Feb. 10, 2026

(54) VACUUM BLENDER

(71) Applicants: INTROPACK CO., LTD., Pyeongtaek-si (KR); NUC ELECTRONICS CO., LTD., Daegu (KR)

(72) Inventor: Kyul-Joo Lee, Dangjin-Si (KR)

(73) Assignees: INTROPACK CO., LTD., Pyeongtaek-si (KR); NUC ELECTRONICS CO., LTD., Buk-Gu (KR)

( * ) Notice: Subject to any disclaimer, the term of this patent is extended or adjusted under 35 U.S.C. 154(b) by 969 days.

(21) Appl. No.: 17/769,836

(22) PCT Filed: Sep. 25, 2020

(86) PCT No.: PCT/KR2020/013059
§ 371 (c)(1),
(2) Date: Apr. 18, 2022

(87) PCT Pub. No.: WO2021/080204
PCT Pub. Date: Apr. 29, 2021

(65) Prior Publication Data
US 2022/0378250 A1    Dec. 1, 2022

(30) Foreign Application Priority Data
Oct. 21, 2019    (KR) .......................... 10-2019-0130706

(51) Int. Cl.
*A47J 44/00*    (2006.01)
*A47J 43/07*    (2006.01)
*A47J 43/08*    (2006.01)

(52) U.S. Cl.
CPC ........... *A47J 44/00* (2013.01); *A47J 43/0727* (2013.01); *A47J 43/087* (2013.01)

(58) Field of Classification Search
CPC ...... A47J 44/00; A47J 43/0727; A47J 43/087; A47J 43/0716
See application file for complete search history.

(56) References Cited

U.S. PATENT DOCUMENTS 5,257,575 A * 11/1993 Harrison ............. A47J 43/0777
99/511
2014/0254302 A1    9/2014 Yang
(Continued)

FOREIGN PATENT DOCUMENTS

CN    202051589 U    11/2011
CN    202365584 U    8/2012
(Continued)

OTHER PUBLICATIONS

English Translation of KR101772862 (Year: 2017).*
(Continued)

*Primary Examiner* — Steven W Crabb
(74) *Attorney, Agent, or Firm* — Dority & Manning, P.A.

(57) ABSTRACT

A vacuum blender is disclosed. The blender includes a blender body including a container support case, an outer container seated in the container support case, a grinding blade, and a blade driving unit for rotating the grinding blade; an inner container unit including an inner container disposed in the outer container and in which the grinding blade is located, and an inner container driving unit for rotating the inner container; a vacuum unit installed in the container support case and configured to perform a blending operation on an object to be blended accommodated in the inner container in a vacuum state, wherein the outer container is opened and closed by an outer container cover, the inner container is opened and closed by an inner container cover, the inner container cover is assembled to rotate on the outer container cover.

9 Claims, 15 Drawing Sheets

(56) References Cited

U.S. PATENT DOCUMENTS

2020/0205614 A1* 7/2020 Ahn .................. B02C 18/16
2022/0225837 A1* 7/2022 Kim .................. A47J 43/0777

FOREIGN PATENT DOCUMENTS

| CN | 203138172 U | | 8/2013 |
|---|---|---|---|
| CN | 107136893 A | | 9/2017 |
| JP | 2004016572 A | | 1/2004 |
| JP | 3187443 | | 11/2013 |
| KR | 20110138108 A | | 12/2011 |
| KR | 10-1226441 | | 1/2013 |
| KR | 20140028750 A | * | 3/2014 |
| KR | 20140042236 A | * | 4/2014 |
| KR | 20170079453 A | * | 7/2017 |
| KR | 20170096383 A | | 8/2017 |
| KR | 101772862 | | 9/2017 |
| KR | 101772862 B1 | * | 9/2017 |
| KR | 10-1974747 | | 5/2019 |
| KR | 10-2019-0089823 | | 7/2019 |
| KR | 10-2008731 | | 8/2019 |

OTHER PUBLICATIONS

English Translation of KR20140028750 (Year: 2014).*
English Translation of KR20140042236 (Year: 2014).*
English Translation of KR20170079453 (Year: 2017).*
Japanese Office Action for corresponding JP Application No. 2022-523358, issued Apr. 19, 2023, 4 pages.
PCT International Search Report (w/ English Translation) for corresponding Application No. PCT/KR2020/013059, mailed Dec. 17, 2020, 5 pages.
Chinese Office Action for corresponding Application No. 202080073602.3, dated Jul. 20, 2023, 8 pages.

\* cited by examiner

【FIG.13】
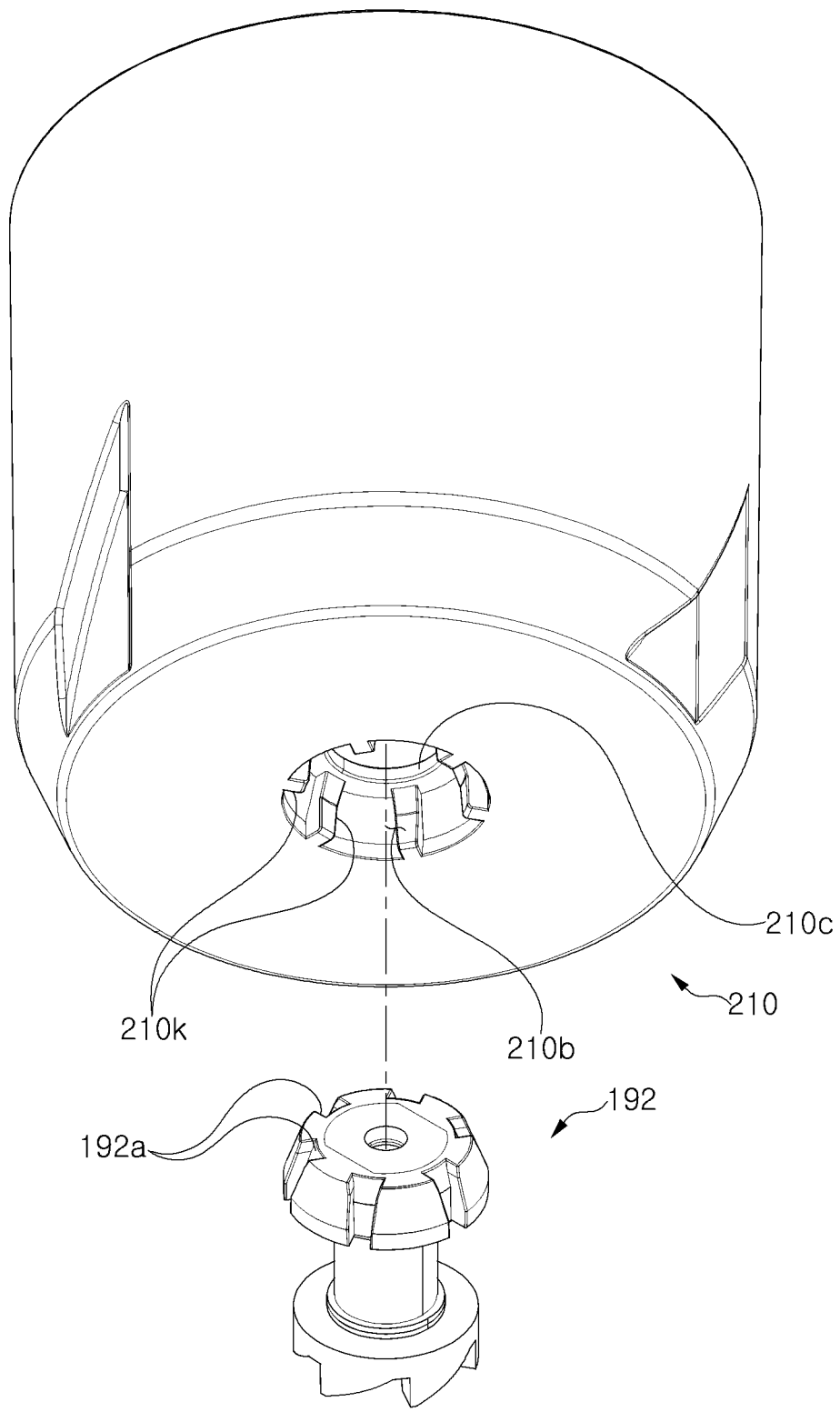

[FIG.14]
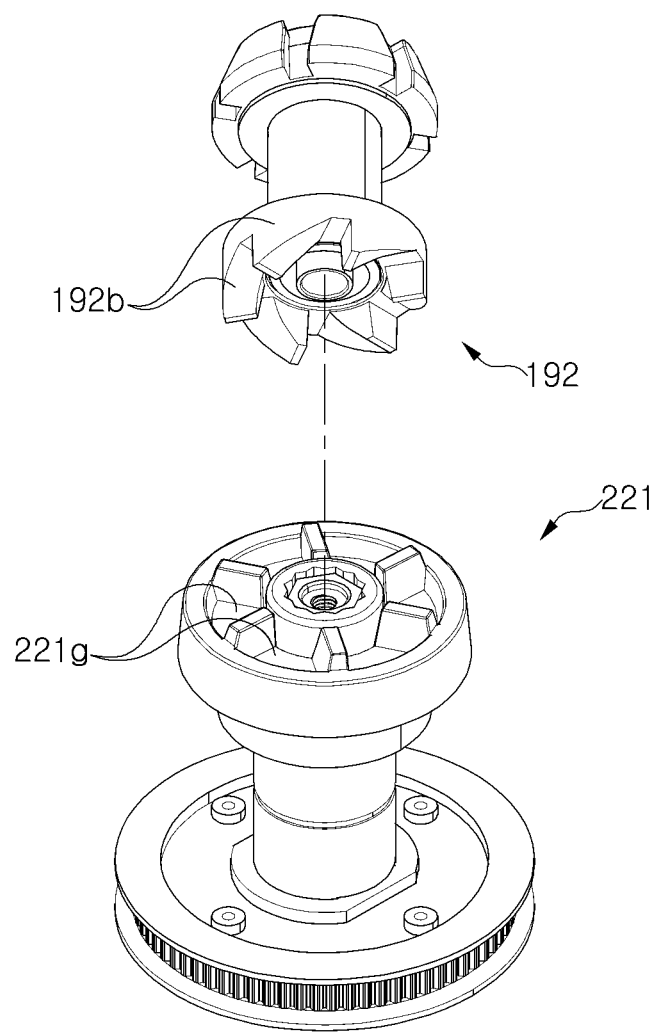

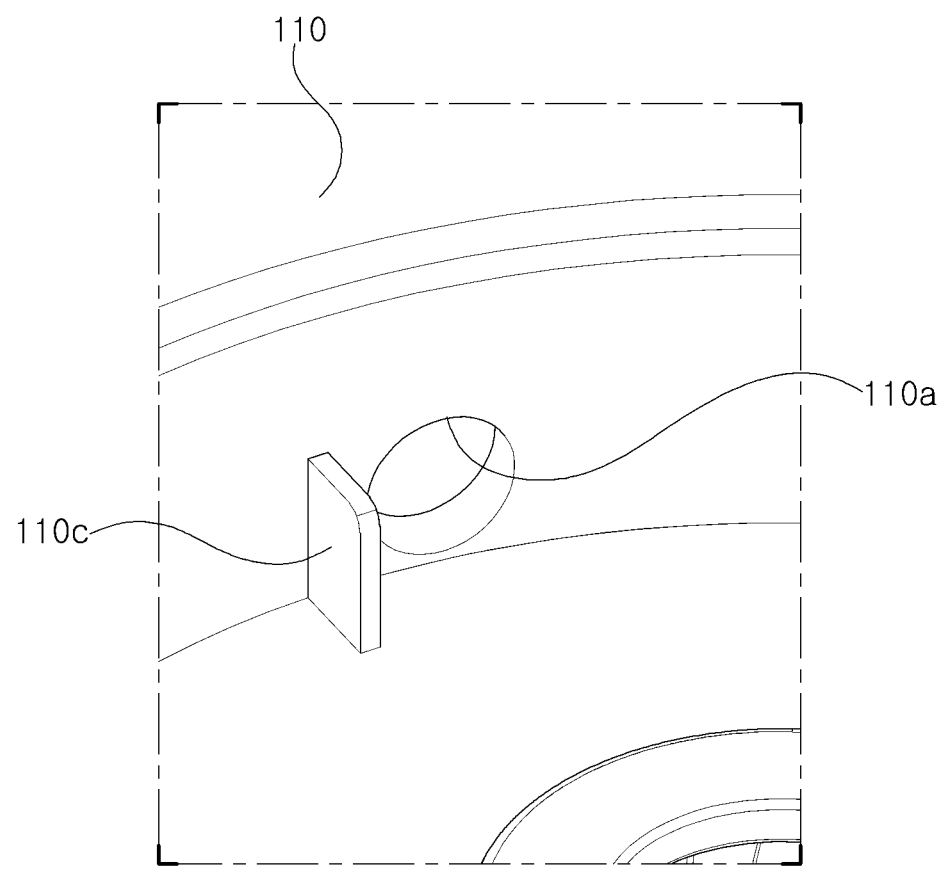
[FIG.15]

VACUUM BLENDER

CROSS REFERENCE TO RELATED APPLICATIONS

This application is the U.S. National Stage entry of International Application No. PCT/KR2020/013059 filed under the Patent Cooperation Treaty on Sep. 25, 2020, which claims priority to Korean Patent Application No. 10-2019-0130706 filed on Oct. 21, 2019, both of which are incorporated herein by reference.

TECHNICAL FIELD

The present disclosure relates to a vacuum blender, and more particularly, to a vacuum blender, grinding an object to be blended to extract juice.

BACKGROUND ART

In general, a blender is an electric device including a container (cup) into which an object to be blended is inserted and a body in which an electric motor is accommodated.

Here, the container is formed of hard heat-resistant glass, a synthetic resin, or stainless steel, and a grinding blade formed of stainless steel is mounted at a lower portion of the container while being engaged with a driving unit.

In addition, as the electric motor accommodated in the body rotates at a high speed, the blender has been widely used in the home for the purpose of extracting juice from the object to be blended as well as the purpose of cutting and grinding the object to be blended including fruits and vegetables.

However, as disclosed in Korean Patent No. 10-1772862, the blender has a limitation that a protrusion part is formed on an inner container of the blender, and an object to be blended accommodated in the inner container is caught by the protrusion part while rotating by rotation of a grinding blade, and thus, reverse rotation of the inner container in an opposite direction to a rotation direction of the grinding blade is not smoothly performed, and in particular, when an output of an inner container driving motor is low, the reverse rotation of the inner container is not performed at all.

Furthermore, even though the object to be blended is ground, in order to extract and eat juice, juice extraction needs to be performed using a separate juicer, which is inconvenient.

DISCLOSURE

Technical Problem

An aspect of the present disclosure is to provide a vacuum blender capable of improving grinding performance of an object to be blended.

Technical Solution

According to an aspect of the present disclosure, a vacuum blender includes: a blender body including a container support case, an outer container seated on the container support case, a grinding blade, and a blade driving unit rotating the grinding blade; an inner container unit including an inner container which is disposed in the outer container and in which the grinding blade is positioned, and an inner container driving unit rotating the inner container; and a vacuum unit installed in the container support case and configured so that a blending operation for an object to be blended accommodated in the inner container is performed in a vacuum state, wherein the outer container is opened and closed by an outer container cover, the inner container is opened and closed by an inner container cover, and the inner container cover is rotatably assembled to the outer container cover, a blade rotation shaft of the blade driving unit is installed to be axially rotated in a hollow formed in an inner container rotation shaft of the inner container driving unit, such that the blade rotation shaft and the inner container rotation shaft are axially rotated independently of each other, and an intermediate rotation shaft unit connecting the blade driving unit and the grinding blade to each other and connecting the inner container driving unit and the inner container to each other is installed in the outer container.

Here, the blade driving unit and the inner container driving unit may be mounted in the container support case, and the outer container may be detachably connected to the container support case, the intermediate rotation shaft unit may include: a first intermediate rotation shaft connecting the blade rotation shaft of the blade driving unit and the grinding blade to engage with each other; and a second intermediate rotation shaft connecting the inner container rotation shaft of the inner container driving unit and the inner container to engage with each other, and the second intermediate rotation shaft and the first intermediate rotation shaft may axially rotate independently of each other while the second intermediate rotation shaft surrounds the first intermediate rotation shaft.

In this case, the first intermediate rotation shaft may have an upper portion key-fastened to the grinding blade and a lower portion key-fastened to the blade rotation shaft, and the second intermediate rotation shaft may have an upper portion key-fastened to the inner container and a lower portion key-fastened to the inner container rotation shaft.

Specifically, the first intermediate rotation shaft may have first keyways formed in an upper portion thereof, and the grinding blade may have lower keys protruding on inner side surfaces of a lower groove formed in the grinding blade and key-fastened to the first keyways, and the first keyway may extend downward from an upper end of a side surface of the first intermediate rotation shaft and extend in both side directions at a lower portion thereof.

in addition, a shaft magnet may be embedded in an upper portion of the first intermediate rotation shaft, and a body magnet may be embedded in the grinding blade, such that the first intermediate rotation shaft and the grinding blade are attached to each other by magnetic forces of the shaft magnet and the body magnet together with the key fastening.

In addition, a lower hole through which the first intermediate rotation shaft penetrates may be formed in the inner container, and a support jaw may be formed on an upper edge of the lower hole, and an upper portion of the second intermediate rotation shaft may be inserted into the lower hole of the inner container to be assembled while supporting the support jaw of the inner container upward and be key-fastened to inner side surfaces of the lower hole, and a lower portion of the second intermediate rotation shaft may be inserted into and assembled to an upper groove of the inner container rotation shaft and be key-fastened to inner side surfaces of the upper groove.

Meanwhile, the blade driving unit and the inner container driving unit may be configured to rotate the grinding blade and the inner container in opposite directions.

Here, the inner container may have a protrusion part formed on an inner side surface thereof so that the object to be blended rotationally flowing while being ground by the grinding blade is caught, and the protrusion part may have a shape of a screw protrusion line inducing a downward spiral flow of the object to be blended so that the object to be blended flows downward while rotating in an opposite direction to the rotation of the grinding blade.

Meanwhile, the inner container may have a plurality of dehydration holes formed in side portions thereof so that the object to be blended is dehydrated when being rotated.

In this case, a discharge pipe protruding outwardly may be formed at a lower portion of the outer container so that juice dehydrated from the object to be blended is discharged outwardly of the outer container, and a guide protrusion jaw may be formed to protrude on one side of a lead portion of the discharge pipe at a lower portion of an inner surface of the outer container so as to block a rotational flow of the juice generated from the object to be blended to allow the juice to be guided to and introduced into the lead portion of the discharge pipe.

Advantageous Effects

As set forth above, in the vacuum blender according to the present disclosure, the blade rotation shaft and the inner container rotation shaft axially rotate independently of each other, the intermediate rotation shaft unit connecting the blade driving unit and the grinding blade to each other and connecting the inner container driving unit and the inner container to each other is installed in the outer container, such that the inner container and the grinding blade may rotate in opposite directions in a stable and balanced manner, and the outer container is attached to and detached from the container support case, such that driving connection and driving disconnection between the grinding blade and the blade driving unit and between the inner container and the inner container driving unit may be smoothly and easily performed.

In addition, in the vacuum blender according to the present disclosure, the guide protrusion jaw may be formed to protrude on one side of a lead portion of the discharge pipe at a lower portion of an inner surface of the outer container to guide and introduce the dehydrated juice to the lead portion of the discharge pipe, such that the juice may be smoothly and easily discharged through the discharge pipe.

Furthermore, the vacuum blender according to the present disclosure has a structure in which a gear fastening structure of an inner container driving connection part varies or a plurality of inner container driving motors are configured so that the inner container has different rotation speeds when grinding the object to be blended and when dehydrating the object to be blended, and thus, the vacuum blender may smoothly reversely rotate objects to be blended close to inner side surfaces of the inner container among objects to be blended rotating forward by forward rotation of the grinding blade by decreasing a rotation speed of reverse rotation of the inner container and increasing a torque when grinding the object to be blended, and may maximize a dehydration effect by increasing a rotation speed of the inner container as much as possible when dehydrating the ground object to be blended as compared with when grinding the object to be blended.

DESCRIPTION OF DRAWINGS

FIG. 13 is an exploded perspective view in which an inner container and a second intermediate rotation shaft are disassembled.

FIG. 14 is an exploded perspective view in which the second intermediate rotation shaft and an inner container rotation shaft are disassembled.

FIG. 15 is a view illustrating an inner portion of an outer container in the vacuum blender of FIGS. 1 and 2.

BEST MODE FOR INVENTION

Figure 1:
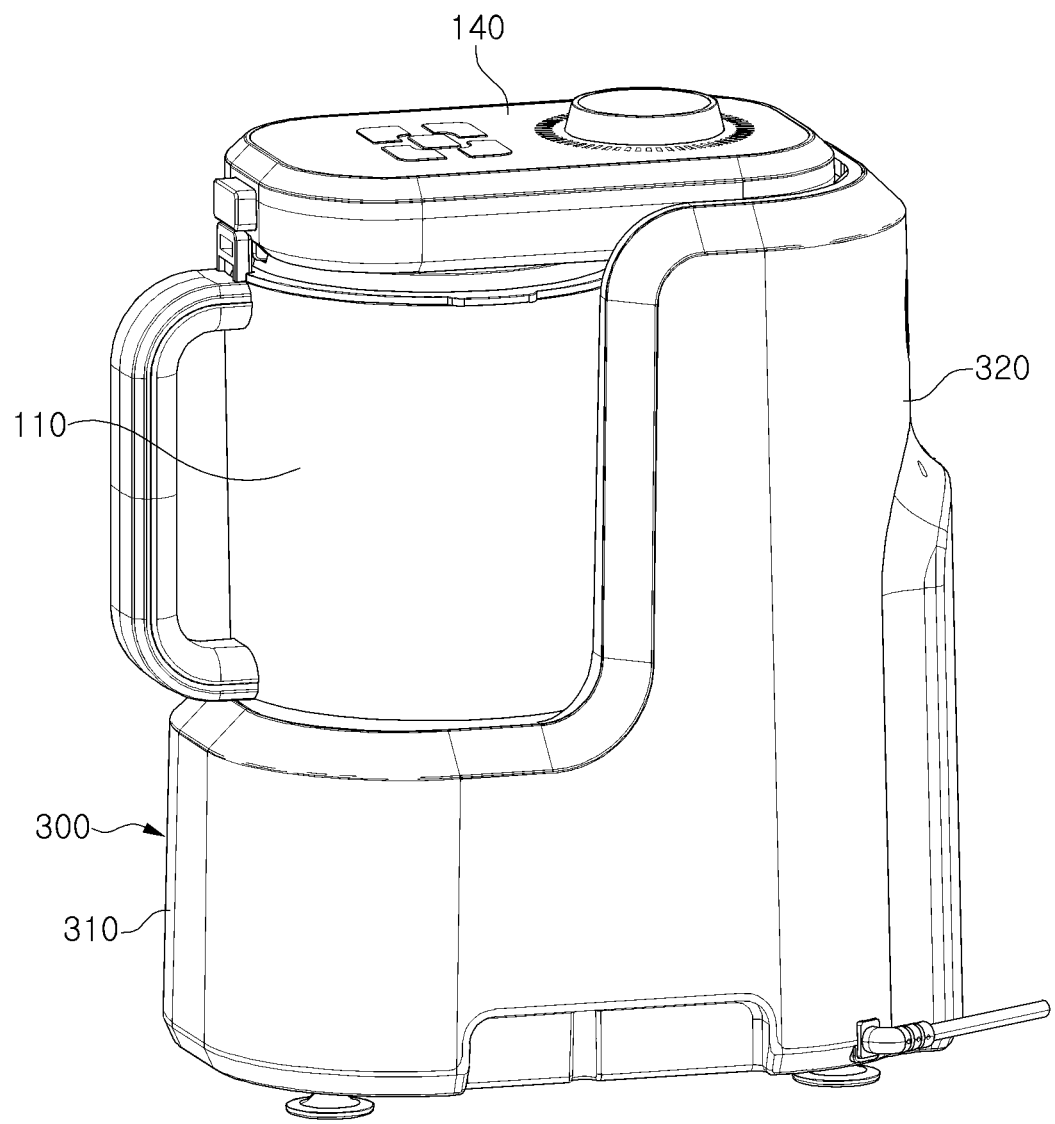
FIGS. 1 and 2 are perspective views illustrating a vacuum blender according to the present disclosure.

Hereinafter, the present disclosure will be described in detail with reference to the accompanying drawings. It is noted that in giving reference numerals to components of the respective drawings, the same components will be denoted by the same reference numerals even though they are illustrated in different drawings. Further, in describing exemplary embodiments in the present disclosure, when it is determined that a detailed description of a related known configuration or function may obscure the gist of the present disclosure, the detailed description will be omitted.

Figure 2:
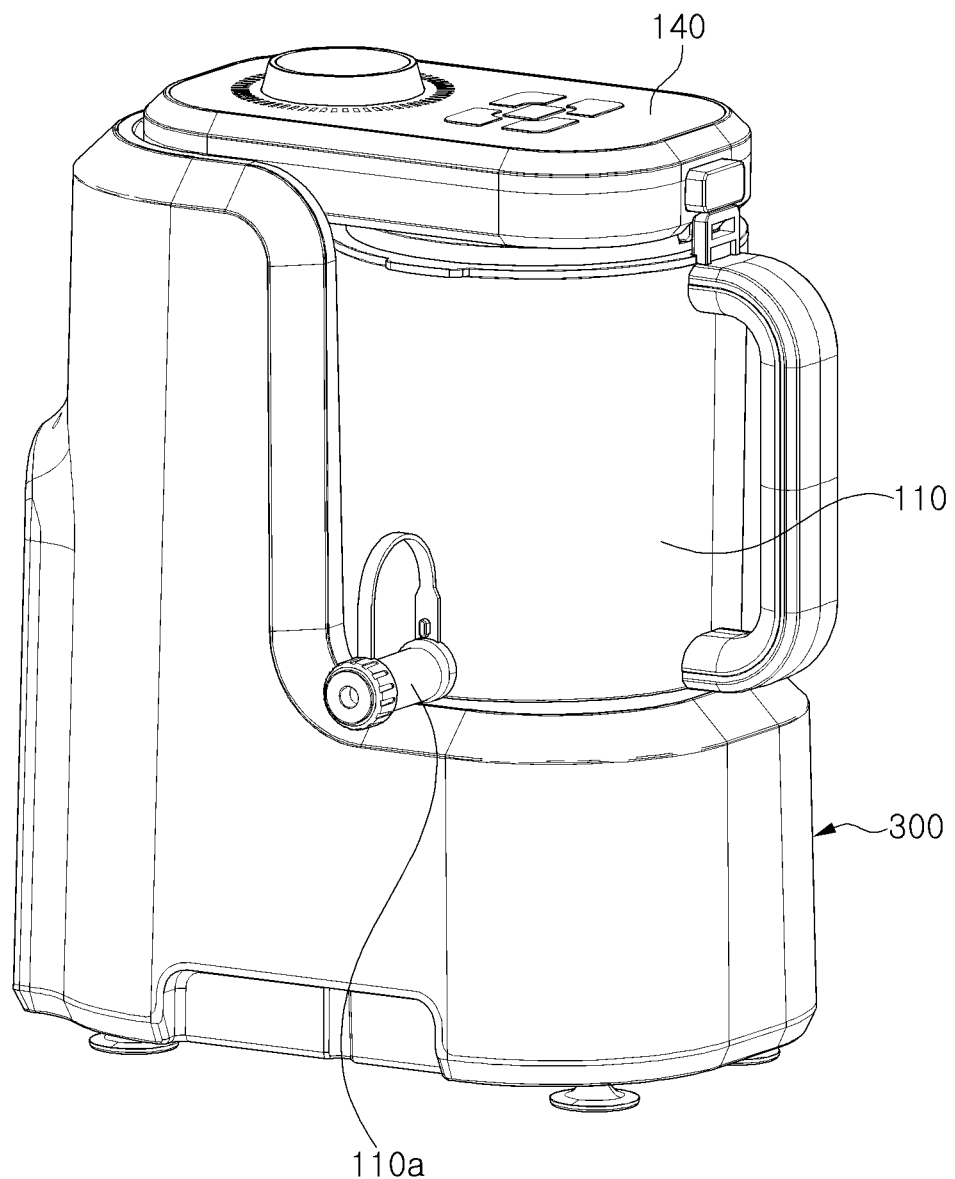
Figure 3:
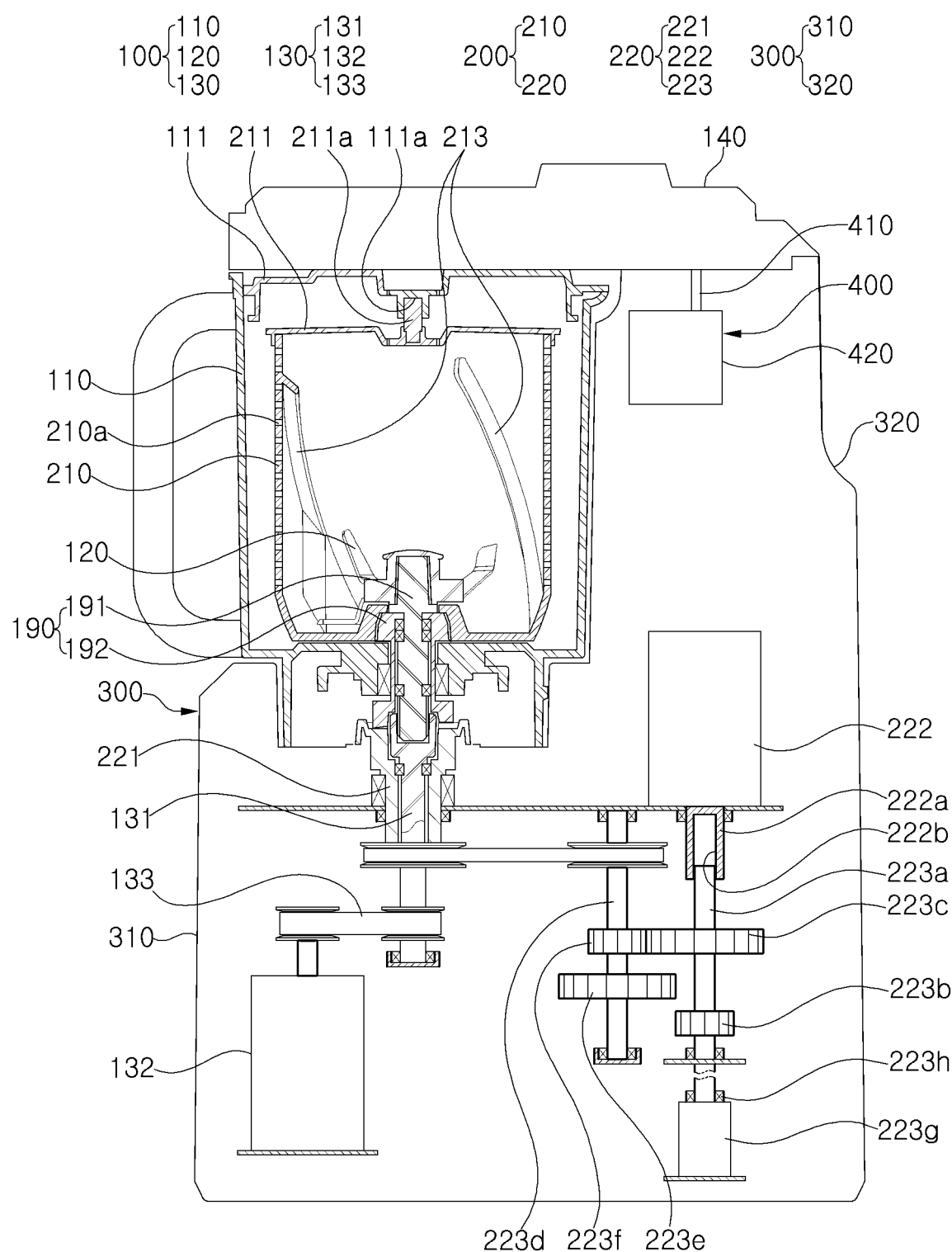
FIG. 3 is a view illustrating an inner portion of a vacuum blender according to an exemplary embodiment in the present disclosure.
Figure 4:
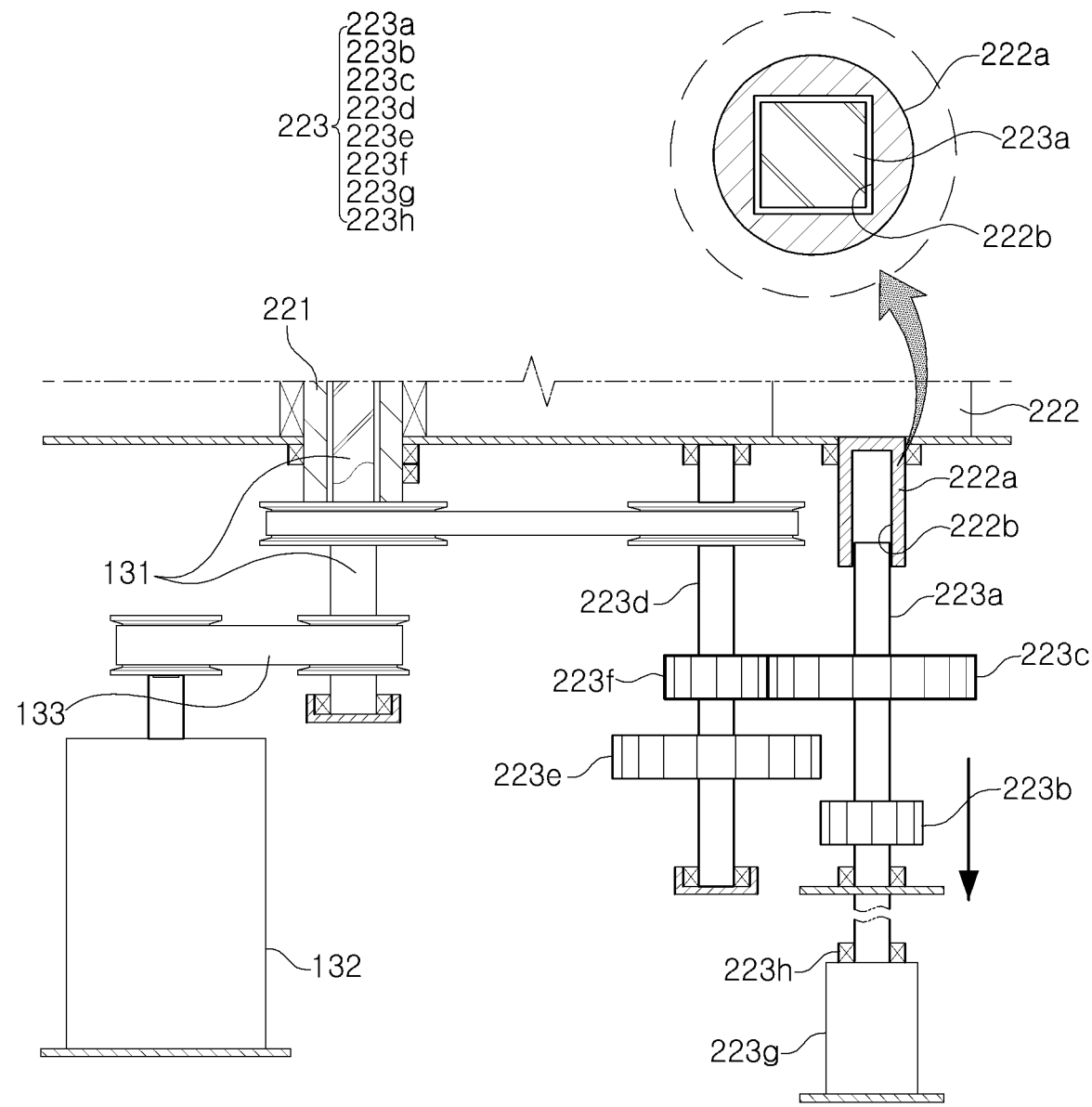
FIGS. 4 and 5 are views illustrating an operation state of an inner container driving unit in the vacuum blender of FIG. 3.
Figure 5:
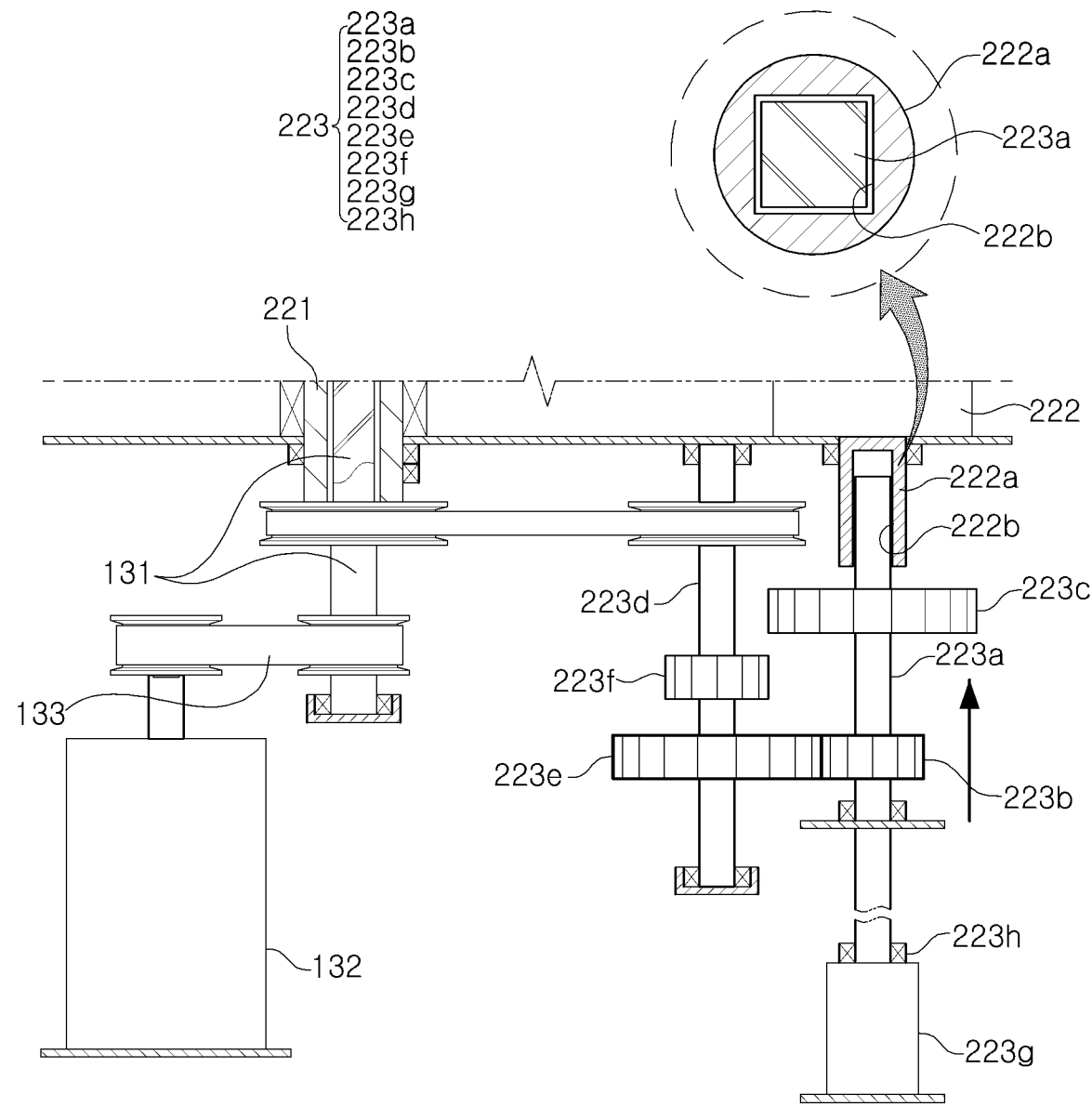

FIGS. 1 and 2 are perspective views illustrating a vacuum blender according to the present disclosure, FIG. 3 is a view illustrating an inner portion of a vacuum blender according to an exemplary embodiment in the present disclosure, and FIGS. 4 and 5 are views illustrating an operation state of an inner container driving unit in the vacuum blender of FIG. 3.

Referring to the drawings, a vacuum blender according to an exemplary embodiment in the present disclosure includes a blender body and an inner container unit.

Here, the blender body 100 includes an outer container 110, a grinding blade 120, and a blade driving unit 130.

Specifically, the outer container 110 has an upper opened structure in which a lower surface thereof is closed and an upper portion thereof is opened so that an object to be blended may be accommodated therein, and is covered by a blender cover 140 pivotable mounted on a container support case 300 to be described later.

In addition, the outer container 110 is opened and closed by an outer container cover 111, and may be closed by the outer container cover 111 covering an upper portion thereof before being seated on the container support case 300.

In this case, the object to be blended refers to food ground by an operation of a vacuum blender.

In addition, the grinding blade 120 is disposed in an inner container 210, and serves to grind and liquefy the object to be blended in the inner container 210 when being rotated.

In addition, the blade driving unit 130 is configured to rotate the grinding blade 120.

In addition, the outer container 110 is a structure seated on the container support case 300. That is, the outer container 110 is supported by the container support case 300, and such a container support case 300 has an L-shape as a whole as illustrated in the drawings.

The container support case 300 includes a lower casing part 310 positioned below the outer container 110 and a side casing part 320 extending upward from the lower casing part 310 and connected to the blender cover 140.

Specifically, in the container support case 300, the outer container 110 is seated on an upper surface of the lower casing part 310 disposed in a transverse direction, and the blender cover 140 is hinge-coupled to an upper end of the side casing part 320 extending upward from the lower casing part 310 and disposed in a longitudinal direction so as to be pivotable in an up and down direction.

Such a container support case 300 has the blade driving unit 130 and an inner container driving unit 220 to be described later installed therein. When the outer container 110 in which the inner container 210 is embedded is seated on the container support case 300, the grinding blade 120 positioned in the inner container 210 and the blade driving unit 130 installed in the container support case 300 are connected to each other so that a driving force is transferred, and the inner container 210 installed in the outer container 110 and the inner container driving unit 220 installed in the container support case 300 are connected to each other so that a driving force is transferred.

More specifically, the outer container 110 is detachably connected to the container support case 300. For example, a spiral projection to be fitted into the container support case 300 is formed on an outer peripheral surface of a lower protrusion part of the outer container 110, a spiral groove is formed in an inner peripheral surface of a seating groove of container support case 300 on which the lower protrusion part is seated, and the projection is fitted into the spiral groove, such that the outer container may be mounted on the container support case 300, and the projection is released from the spiral groove, such that the outer case may be separated from the container support case 300.

Meanwhile, an inner container unit 200 includes the inner container 210 and the inner container driving unit 220.

Here, the inner container 210 is installed in the outer container 110, is opened and closed by an inner container cover 211, and may be closed by the inner container cover 211 covering an upper portion thereof before being seated on the container support case 300.

In addition, the inner container cover 211 may be rotatably assembled to the outer container cover 111. As an example, a central projection 211a may be formed at an upper portion of the inner container cover 211, and a projection support groove 111a into which the central projection 211a of the inner container cover 211 is inserted and rotationally supported may be formed at a lower portion of the outer container cover 111.

In addition, in order to form a vacuum of the inner container 210 by a vacuum unit 400 to be described later, a suction hole may be formed in the central projection 211a, and a suction hole may be formed in an upper portion of the projection support groove 111a.

In addition, such an inner container 210 may have one or more protrusion parts 213 formed on inner side surfaces thereof so that the object to be blended rotationally flowing while being ground by the grinding blade 120 is caught.

In the vacuum blender according to the present disclosure, the blade driving unit 130 and the inner container driving unit 220 are configured to rotate the grinding blade 120 and the inner container 210 in opposite directions, and when the grinding blade 120 is rotated in a state in which the object to be blended is accommodated in the inner container 210, if the object to be blended collides with the protrusion parts 213 formed on the inner side surfaces of the inner container 210 rotating in an opposite direction, large turbulence of the object to be blended is generated to increase a grinding effect of the object to be blended.

In addition, the object to be blended flows upward while being radially pushed out by a centrifugal force by the rotation of the grinding blade 120, and the protrusion parts 213 inducing a downward spiral flow of the object to be blended and having a screw protrusion part shape are formed on the inner side surfaces of the inner container 210 to allow the object to be blended to flow toward the grinding blade 120 disposed on the lower side of the inner container 210, such that the grinding effect of the vacuum blender may be further increased.

In addition, for an irregular flow of the object to be blended of the inner container 210, a controller (not illustrated) may control an inner container driving motor 222 of the inner container driving unit 220 to be described later to reversely rotate the inner container 210 in an opposite direction to the grinding blade 120 to perform repeated operations of reversely rotating and stopping the inner container 210.

In addition, the inner container 210 may have a plurality of dehydration holes 210a formed in side portions thereof so that the object to be blended is dehydrated when being rotated in order to extract only juice from the object to be blended ground by the grinding blade 120.

In this case, the dehydration holes 210a are illustrated to be large in the drawings, but the dehydration holes 210a are actually very small holes through which only the juice of the object to be blended may pass, and a plurality of holes may be formed as a mesh structure in the side portions of the inner container 210. Furthermore, the dehydration holes 210a may be directly formed in the side portions of the inner container 210 as illustrated in the drawings, and as another example, although not illustrated in the drawings, a structure in which mesh members formed as a separate member are mounted to be portions of the side portions of the inner container 210 may be used.

In addition, the dehydration holes 210a may be formed in a lower portion or the side portions of the inner container 210. In this case, it is preferable that the dehydration holes 210a are not formed in the lower portion of the inner container 210, and are formed in the side portions of the inner container 210, and it is more preferable that the dehydration holes 210a are formed from a predetermined height or more of the side portions of the inner container 210, which is to maintain a state in which a predetermined amount of liquid is accommodated because a blending effect is increased when there is a predetermined amount of liquid (e.g., separate water or juice generated when blending the object to be blended) when blending the object to be blended.

Even though the dehydration holes 210a are formed from a predetermined height or more of the side portions of the inner container 210, since the inner container 210 rotates at a much faster speed when the object to be blended is dehydrated than when the object to be blended is ground, the juice easily moves upward along the inner side surfaces of the inner container 210, such that the juice may sufficiently come out of the inner container 210 through the dehydration holes 210a.

Meanwhile, as illustrated in FIGS. 2 and 15, a discharge pipe 110a protruding outward may be formed at a lower portion of the outer container 110 so that the juice dehydrated from the object to be blended is discharged outwardly of the outer container 110. For reference, as for reference numerals in a description to be described later related to the discharge pipe 110a, refer to FIGS. 3 to 5.

That is, when the juice of the object to be blended comes out through the dehydration holes 210a of the inner container 210 by a dehydration process of the object to be blended, the discharge pipe 110a that is downward inclined may be formed at a lower end portion of a side portion of the outer container 110 so that the juice may be extracted without separating the outer container 110 from the container support case 300.

Furthermore, a guide protrusion jaw 110c may be formed on one side of a lead portion of the discharge pipe 110a at a lower portion inside the outer container 110.

In order to grind the object to be blended and then dehydrate the ground object to be blended, that is, in order to extract the juice from the object to be blended, the inner container 210 rotates at a high speed. However, the juice coming out of the inner container 210 through the dehydration holes 210a is affected by the high-speed rotation of the inner container 210 to continuously rotationally flow between the inner container 210 and the outer container 110, and thus, does not come out of the outer container well through the discharge pipe 110a.

In other words, the rotational flow of the juice is continuously maintained between the inner container 210 and the outer container 110 by the high-speed rotation of the inner container 210, such that the juice is not easily introduced into the lead portion of the discharge pipe 110a.

Accordingly, the guide protrusion jaw 110c is formed to protrude on one side of the lead portion of the discharge pipe at a lower portion of an inner surface of the outer container 110, and serves to block the rotational flow of the juice generated from the object to be blended to guide the juice so that the juice is introduced into the lead portion of the discharge pipe 110a.

In addition, the inner container driving unit 220 is configured to rotate the inner container 210.

Specifically, the inner container driving unit 220 includes an inner container rotation shaft 221, an inner container driving motor 222, and an inner container driving connection part 223.

In addition, the above-described blade driving unit 130 includes a blade rotation shaft 131, a blade driving motor 132, and a blade driving connection part 133.

Here, the inner container rotation shaft 221 is connected to the lower portion of the inner container 210 embedded in the outer container 110 so that a rotational driving force is transferred to the lower portion of the inner container 210 when the outer container 110 is seated on the container support case 300, and the blade rotation shaft 131 is connected to the lower portion of the grinding blade 120 embedded in the inner container 210 so that a rotational driving force is transferred to the lower portion of the grinding blade 120 when the outer container 110 is seated on the container support case 300.

In this case, the blade rotation shaft 131 is installed to be axially rotated in a hollow formed in the inner container rotation shaft 221, and the blade rotation shaft 131 and the inner container rotation shaft 221 have a structure in which they are axially rotated independently of each other.

That is, the hollow of the inner container rotation shaft 221 is provided with a bearing so that the blade rotation shaft 131 may be installed in the hollow while penetrating through the hollow, such that the blade rotation shaft 131 may rotate independently of the inner container rotation shaft 221 inside the inner container rotation shaft 221.

Meanwhile, an intermediate rotation shaft unit 190 connecting the blade driving unit 130 and the grinding blade 120 to each other and connecting the inner container driving unit 220 and the inner container 210 to each other is installed in the outer container 110.

Specifically, the intermediate rotation shaft unit 190 may include a first intermediate rotation shaft 191 and a second intermediate rotation shaft 192.

Here, the first intermediate rotation shaft 191 has a structure in which it connects the blade rotation shaft 131 of the blade driving unit 130 and the grinding blade 120 to engage with each other.

In addition, the second intermediate rotation shaft 192 has a structure in which it connects the inner container rotation shaft 221 of the inner container driving unit 220 and the inner container 210 to engage with each other.

In this case, the second intermediate rotation shaft 192 and the first intermediate rotation shaft 191 axially rotate independently of each other while the second intermediate rotation shaft 192 surrounds the first intermediate rotation shaft 191. That is, the first intermediate rotation shaft 191 is disposed in a hollow of the second intermediate rotation shaft 192, and a bearing is mounted between the first intermediate rotation shaft 191 and the second intermediate rotation shaft 192, such that the first intermediate rotation shaft 191 and the second intermediate rotation shaft 192 have a structure in which they are axially rotated independently of each other while stably and firmly maintaining a spaced distance therebetween.

In addition, the first intermediate rotation shaft 191 has an upper portion key-fastened to the grinding blade 120 and a lower portion key-fastened to the blade rotation shaft 131, and the second intermediate rotation shaft 192 has an upper portion key-fastened to the inner container 210 and a lower portion key-fastened to the inner container rotation shaft 221.

Figure 9:
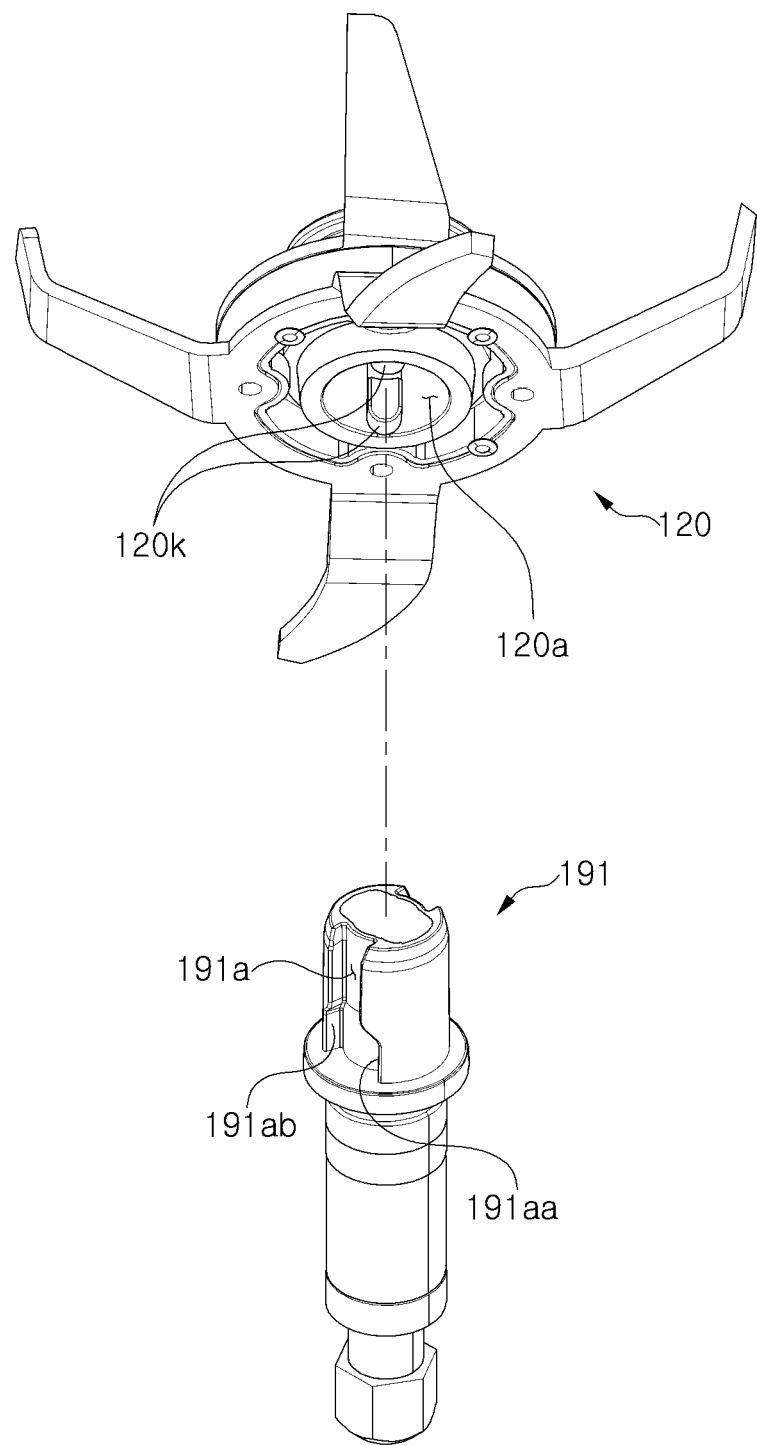
FIGS. 9 to 11 are views illustrating a grinding blade and a first intermediate rotation shaft.
Figure 10:
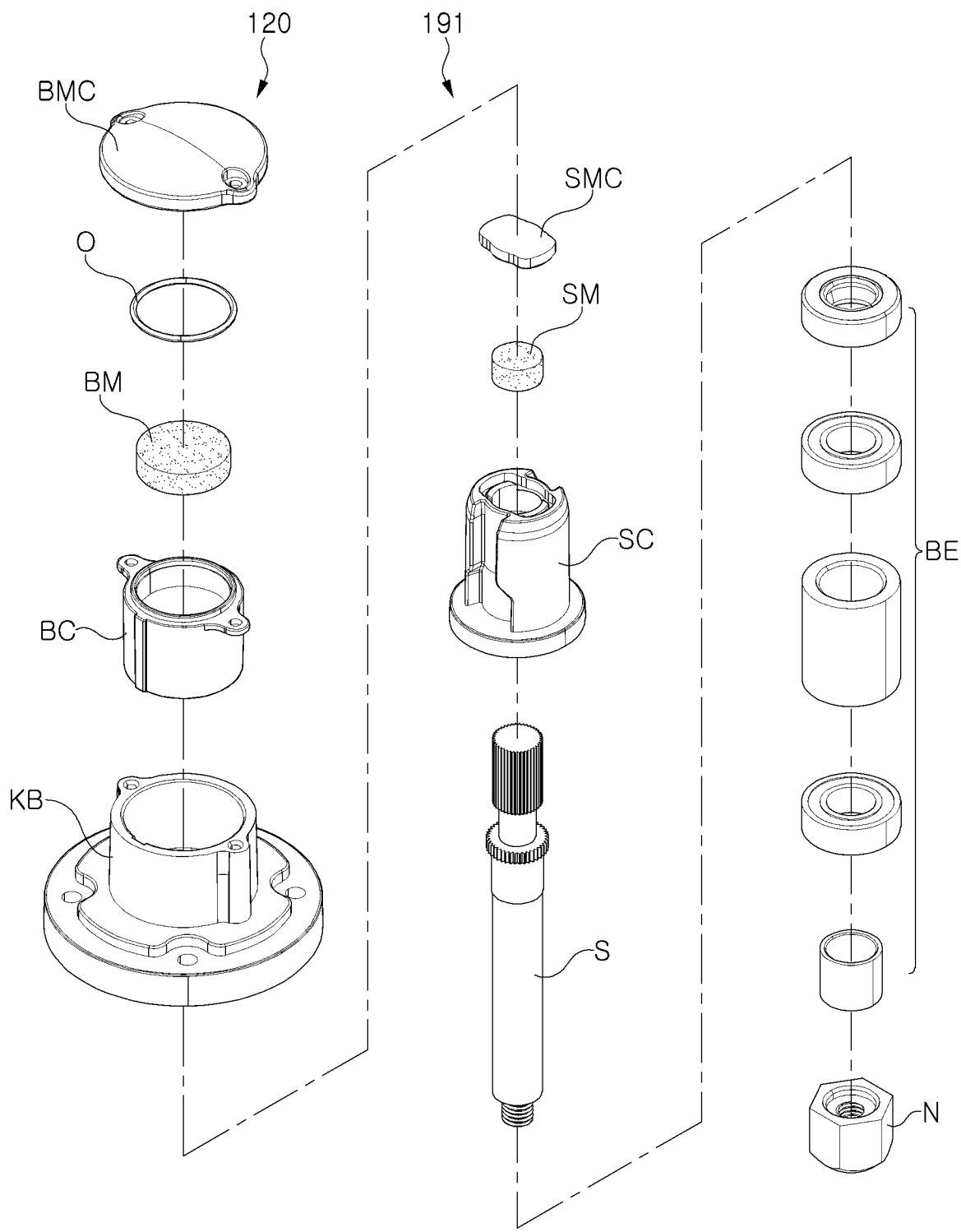
Figure 11:
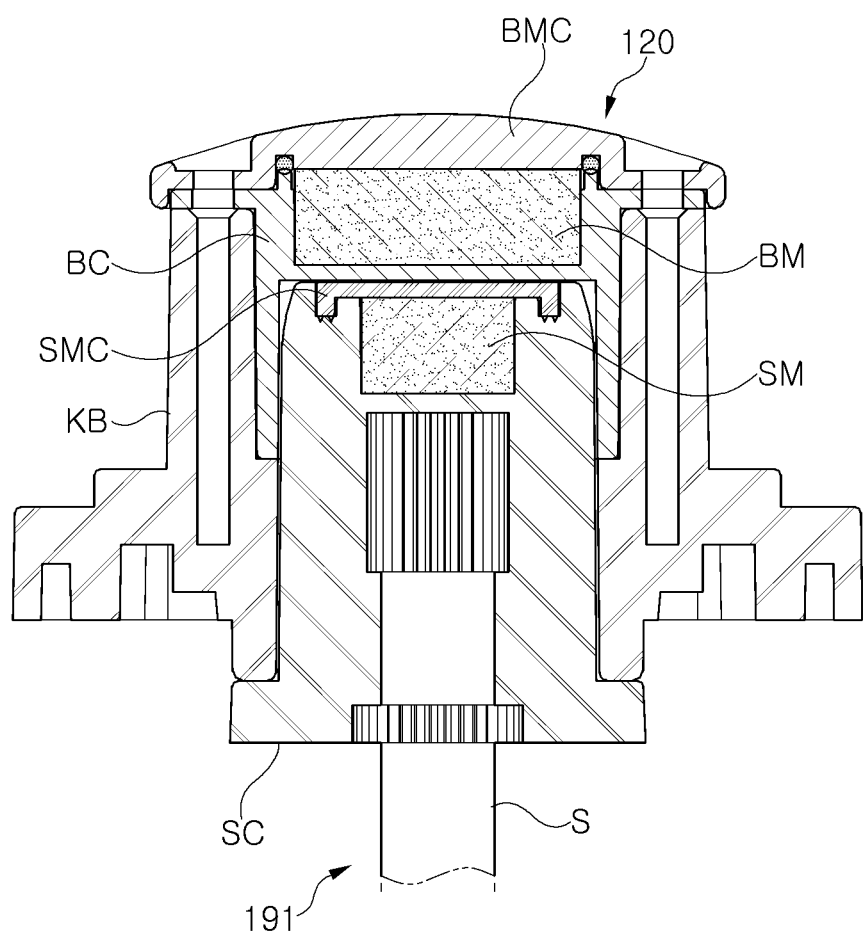

Specifically, as illustrated in FIGS. 9 to 11, the upper portion of the first intermediate rotation shaft 191 is inserted into and assembled to a lower groove 120a of the grinding blade 120, and is key-fastened to an inner side surface of the lower groove 120a, such that the grinding blade 120 has a structure in which it rotates in conjunction with the first intermediate rotation shaft 191 while being in a firm position fixed state in which it does not move in a lateral direction.

More specifically, the first intermediate rotation shaft 191 has first keyways 191a formed in side surfaces of an upper portion thereof, the grinding blade 120 has lower keys 120k formed to protrude on inner side surfaces of the lower groove 120a, and when the lower keys 120k are inserted into the first keyways 191a, the first intermediate rotation shaft 191 and the grinding blade 120 are key-fastened to each other.

Here, the grinding blade 120 tends to float upward when it is stopped after being rotated within the inner container 210. In order to prevent such a problem, the first keyway 191a may have a structure in which it extends downward from an upper end of a side surface of the first intermediate rotation shaft 191 and extends in both side directions at a lower portion thereof, that is, a ⊥-shape.

Due to such a shape structure, after the lower keys 120k of the grinding blade 120 are vertically inserted downward into the first keyways 191a, the lower keys 120k are horizontally moved to one side portions 191a at lower portions of the first keyways 191a when the first intermediate rotation shaft 191 rotates, and are horizontally moved to the other side portions 191ab at the lower portions of the first keyways 191a when the rotation of the first intermediate rotation shaft 191 is stopped.

As such, movement of the lower keys 120k in an upward direction is blocked when the first intermediate rotation shaft 191 rotates and the rotation of the first intermediate rotation shaft 191 is stopped, such that the grinding blade 120 is not separated from the first intermediate rotation shaft 191. According to such a structure, the grinding blade 120 and the first intermediate rotation shaft 191 are maintained in a state in which they are stably assembled (fastened) to each other.

Meanwhile, the grinding blade 120 may be separated in the upward direction at an intermediate point of a process in which the lower keys 120k are horizontally moved to the other side portion 191ab in a state in which the lower keys 120k are horizontally moved to one side portions 191aa at the lower portions of the first keyways 191a. In order to prevent such a problem, the first intermediate rotation shaft 191 and the grinding blade 120 may be provided with magnetic materials attracting the first intermediate rotation shaft 191 and the grinding blade 120, respectively, in addition to the assembly structure of the grinding blade 120 to the first intermediate rotation shaft 191 described above.

That is, in order to prevent from the grinding blade 120 from being separated in the upward direction, a shaft magnet SM is embedded in an upper portion of the first intermediate rotation shaft 191, and a body magnet BM is embedded in the grinding blade 120, such that the first intermediate rotation shaft 191 and the grinding blade 120 may have a structure in which they are attached to each other by magnetic forces of the shaft magnet SM and the body magnet BM together with the above-described key fastening.

As an example, components illustrated in FIGS. 10 and 11 will be described. the first intermediate rotation shaft 191 may include a lower nut N, a bearing part BE, a shaft member S, a shaft cap SC, the shaft magnet SM, and a shaft magnet cap SMC assembled from the lower side, and the grinding blade 120 may include a blade body KB, a body cover BC, the body magnet BM, an O-ring O, and a body magnet cap BMC in portions other than a blade.

Figure 12:
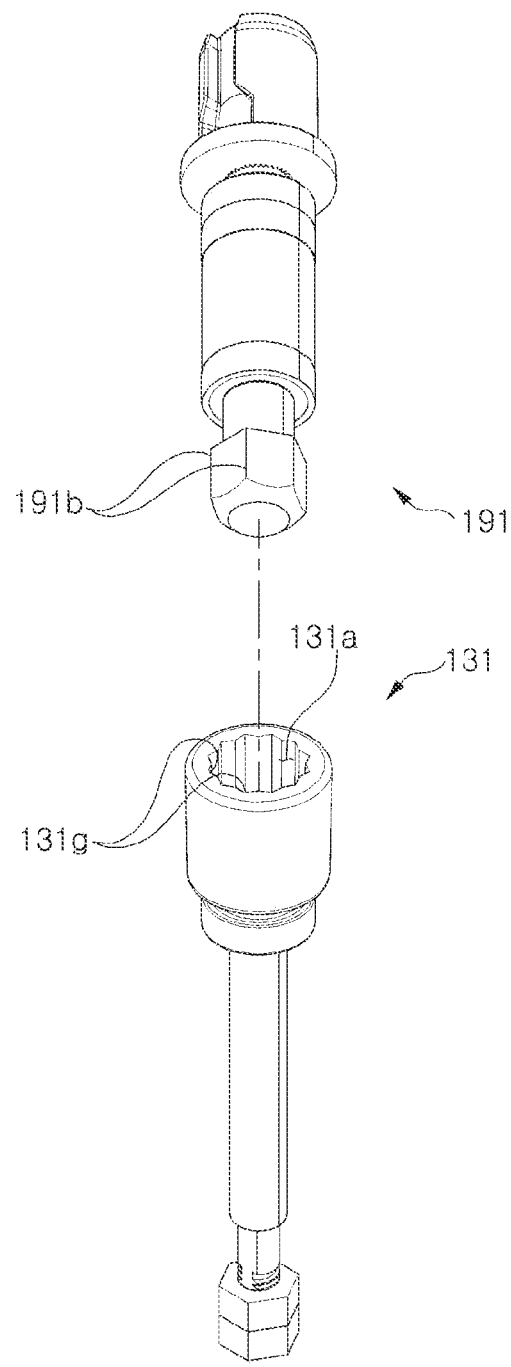
FIG. 12 is an exploded perspective view in which the first intermediate rotation shaft and a blade rotation shaft are disassembled.

In addition, as illustrated in FIG. 12, the lower portion of the first intermediate rotation shaft 191 is inserted into and assembled to an upper groove 131a of the blade rotation shaft 131, and is key-fastened to inner side surfaces of the upper groove 131a, such that the first intermediate rotation shaft 191 is in a firm position fixed state in which it does not move in the lateral direction, and has a structure in which it rotates in conjunction with the blade rotation shaft 131.

Specifically, the first intermediate rotation shaft 191 has first keys 191b formed on side surfaces of the lower portion thereof, the blade rotation shaft 131 has upper keyways 131g formed in an upper portion thereof, and when the first keys 191b are inserted into the upper keyways 131g, the first intermediate rotation shaft 191 and the blade rotation shaft 131 are key-fastened to each other.

In addition, as illustrated in FIG. 13, a lower hole 210b through which the first intermediate rotation shaft 191 penetrates is formed in the inner container 210, and a support jaw 210c is formed on an upper edge of the lower hole 210b.

Meanwhile, an upper portion of the second intermediate rotation shaft 192 is inserted into the lower hole 210b of the inner container 210 to be assembled while supporting the support jaw 210c of the inner container 210 upward, and is key-fastened to inner side surfaces of the lower hole 210b, such that the inner container 210 is in a firm position fixed state in which it does not move in the lateral direction, and has a structure in which it rotates in conjunction with the second intermediate rotation shaft 192.

Specifically, the second intermediate rotation shaft 192 has second keyways 192a formed in side surfaces of an upper portion thereof, the inner container 210 has lower keys 210k formed at the lower portion thereof, and when the lower keys 210k are inserted into the second keyways 192a, the second intermediate rotation shaft 192 and the inner container 210 are key-fastened to each other.

In addition, as illustrated in FIG. 14, a lower portion of the second intermediate rotation shaft 192 is key-fastened and assembled to the inner container rotation shaft 221, such that the second intermediate rotation shaft 192 is in a firm position fixed state in which it does not move in the lateral direction, has a structure in which it rotates in conjunction with the inner container rotation shaft 221.

Specifically, the second intermediate rotation shaft 192 has second keys 192b formed on side surfaces of the lower portion thereof, the inner container rotation shaft 221 has upper keyways 221g formed in an upper portion thereof, and when the second keys 192b are inserted into the upper keyways 221g, the second intermediate rotation shaft 192 and the inner container rotation shaft 221 are key-fastened to each other.

In this case, the second keys 192b may have a structure in which they are inclined upward toward a rotation direction (counterclockwise direction in the drawing) of the inner container 210 so that they are smoothly guided and led into the upper keyways 221g when being inserted into the upper keyways 221g, and are firmly caught by the upper keyways 221g when being rotated in the rotation direction of the inner container 210, that is, an opposite direction of a rotation direction of the grinding blade 120.

As described above, in the present disclosure, the blade rotation shaft 131 and the inner container rotation shaft 221 axially rotate independently of each other, the intermediate rotation shaft unit 190 connecting the blade driving unit 130 and the grinding blade 120 to each other and connecting the inner container driving unit 220 and the inner container 210 to each other is installed in the outer container 110, such that the inner container 210 and the grinding blade 120 may rotate in opposite directions in a stable and balanced manner, and the outer container 110 is attached to and detached from the container support case 300, such that driving connection and driving disconnection between the grinding blade 120 and the blade driving unit 130 and between the inner container 210 and the inner container driving unit 220 may be smoothly and easily performed.

Meanwhile, as illustrated in FIGS. 3 to 5, the inner container driving unit 220 has a structure in which a gear fastening structure of the inner container driving connection part 223 is variable so that the inner container 210 has different rotation speeds when the object to be blended is ground and dehydrated.

That is, when the object to be blended is ground and then dehydrated with the vacuum blender, the inner container 210 is rotated faster than when grinding the object to be blended because the juice needs to be extracted (dehydrated) from the object to be blended. To this end, the inner container driving connection part 223 has a gear fastening structure in which the inner container 210 has a slower rotation speed when the object to be blended is ground than when the object to be blended is dehydrated, and has a gear fastening structure in which the inner container 210 has a faster rotation speed when the object to be blended is dehydrated than when the object to be blended is ground.

Accordingly, the vacuum blender according to the present disclosure may smoothly reversely rotate objects to be blended close to the inner side surfaces of the inner container 210 among objects to be blended rotating forward by a forward rotation of the grinding blade by decreasing a rotation speed of reverse rotation of the inner container 210 and increasing a torque when grinding the object to be blended, and may maximize a dehydration effect by increasing a rotation speed of the inner container 210 as much as possible when dehydrating the ground object to be blended as compared with when grinding the object to be blended.

Specifically, in the inner container driving connection part 223, a driving small gear 223*b* and a driving large gear 223*c* are installed on an inner container driving shaft 223*a* connected to the inner container driving motor 222, and a driven large gear 223*e* and a driven small gear 223*f* are installed on the inner container rotation shaft 221 or an intermediate rotation shaft 223*d* rotating in conjunction with the inner container rotation shaft 221.

Here, the inner container driving shaft 223*a* and the inner container rotation shaft 221 may be disposed in parallel with each other, and as an example, the intermediate rotation shaft 223*d* may be disposed in parallel with the inner container driving shaft 223*a* and the inner container rotation shaft 221 as an additional driving force transfer medium when transferring a driving force from the inner container driving shaft 223*a* to the inner container rotation shaft 221.

In this case, the driven large gear 223*e* and the driven small gear 223*f* may be installed directly on the inner container rotation shaft 221 or may be installed on the intermediate rotation shaft 223*d* as illustrated in the drawings, and a case where the driven large gear 223*e* and the driven small gear 223*f* are installed on the intermediate rotation shaft 223*d* will be described by way of example in the present specification.

Accordingly, an arrangement of the driven large gear 223*e* and the driven small gear 223*f* to be described later may be applied to the inner container rotation shaft 221 when the driven large gear 223*e* and the driven small gear 223*f* are directly installed on the inner container rotation shaft 221.

The driving small gear 223*b* and the driving large gear 223*c* are disposed on the inner container driving shaft 223*a* so as to be spaced apart from each other along an axial direction, and the driven large gear 223*e* and the driven small gear 223*f* are disposed on the intermediate rotation shaft 223*d* so as to be spaced apart from each other long the axial direction.

In this case, the driving small gear 223*b* and the driving large gear 223*c* are sequentially disposed on the inner container driving shaft 223*a* and the driven large gear 223*e* and the driven small gear 223*f* are sequentially disposed on intermediate rotation shaft 223*d* so that the driving small gear 223*b* of the inner container driving shaft 223*a* corresponds to the driven large gear 223*e* of the intermediate rotation shaft 223*d* and the driving large gear 223*c* of the inner container driving shaft 223*a* corresponds to the driven small gear 223*f* of the intermediate rotation shaft 223*d*.

As an example, as illustrated in the drawings, the driving small gear 223*b* and the driving large gear 223*c* are sequentially disposed in the upward direction on the inner container driving shaft 223*a*, and the driven large gear 223*e* and the driven small gear 223*f* are sequentially disposed in the upward direction on the intermediate rotation shaft 223*d*.

For reference, as implied by names of respective components, the driving small gear 223*b* has a relatively smaller diameter than the driving large gear 223*c*, and the driven large gear 223*e* has a relatively larger diameter than the driven small gear 223*f*.

The inner container driving connection part 223 configured as described above may have a structure in which the driving large gear 223*c* and the driven small gear 223*f* are not gear-fastened to each other when the driving small gear 223*b* and the driven large gear 223*e* are gear-fastened to each other and the driving small gear 223*b* and the driven large gear 223*e* are not gear-fastened to each other when the driving large gear 223*c* and the driven small gear 223*f* are gear-fastened to each other, while the inner container driving shaft 223*a* reciprocates in the axial direction.

That is, when the object to be blended is ground, as illustrated in FIG. 4, the inner container driving shaft 223*a* moves downward in the axial direction, and thus, the driving large gear 223*c* and the driven small gear 223*f* are gear-fastened to each other, such that the inner container 210 is decelerated, but rotates with a large torque, and may thus rotate smoothly in an opposite direction to the grinding blade.

In addition, when the object to be blended is dehydrated, as illustrated in FIG. 5, the inner container driving shaft 223*a* moves upward in the axial direction, and thus, the driving large gear 223*c* and the driven small gear 223*f* are gear-fastened to each other, such that the inner container 210 rotates at a relatively faster speed than when the object to be blended is ground, and thus, a dehydration action of extracting the juice from the object to be blended may be effectively performed.

Furthermore, although not illustrated in the drawings, the inner container driving connection part 223 may also have a structure in which the driving large gear 223*c* and the driven small gear 223*f* are not gear-fastened to each other when the driving small gear 223*b* and the driven large gear 223*e* are gear-fastened to each other and the driving small gear 223*b* and the driven large gear 223*e* are not gear-fastened to each other when the driving large gear 223*c* and the driven small gear 223*f* are gear-fastened to each other, while the intermediate rotation shaft 223*d* reciprocates in the axial direction, rather than the reciprocation of the inner container driving shaft 223*a* in the axial direction.

In addition, although not illustrated in the drawings, when the driven large gear 223*e* and the driven small gear 223*f* are directly installed on the inner container rotation shaft 221, the inner container rotation shaft 221 is axially moved.

Meanwhile, the inner container driving connection part 223 may include a shaft moving member 223*g* moving the inner container driving shaft 223*a* in the axial direction. In this case, any driving member according to the related art such as a solenoid cylinder may be used as the shaft moving member 223*g*.

Here, the inner container driving shaft 223*a* may have one end portion axially movably slidably fastened to while being key-fastened to a motor shaft 222*a* of the inner container driving motor 222 so as to axially rotate in conjunction with the motor shaft 222*a*, and the other end portion axially rotatably connected to the shaft moving member 223*g*.

That is, the inner container driving shaft 223*a* has one end portion key-fastened to the motor shaft 222*a* of the inner container driving motor 222 so as to axially rotate in conjunction with the motor shaft 222*a*, such that when the motor shaft 222*a* axially rotates by an operation of the inner container driving motor 222, the inner container driving shaft 223*a* axially rotates in conjunction with the motor shaft 222*a*, and thus, receives a rotational driving force transferred from the inner container driving motor 222.

In addition, the inner container driving shaft 223a has one end portion axially movably slidably fastened to the motor shaft 222a of the inner container driving motor 222, such that even when the inner container driving shaft 223a moves in the axial direction by the shaft moving member 223g, the inner container driving shaft 223a may be maintained in a state in which it is key-fastened to the motor shaft 222a.

As an example, a cross section of a hollow 222b of the motor shaft 222a has a square shape, a cross section of one end portion of the inner container driving shaft 223a is matched to the cross section of a hollow 222b of the motor shaft 222a in terms of shape, such that one end portion of the inner container driving shaft 223a may be axially movably slidably fastened to the motor shaft 222a while being key-fastened to the motor shaft 222a so as to axially rotate in conjunction with the motor shaft 222a.

In addition, the other end portion of the inner container driving shaft 223a is connected to the shaft moving member 223g, such that the inner container driving shaft 223a may axially rotate in a state in which it is connected to the shaft moving member 223g when it moves in the axial direction by the shaft moving member 223g.

As an example, the other end portion of the inner container driving shaft 223a may be connected to the shaft moving member 223g by a shaft rotation bearing 223h.

Meanwhile, the inner container driving connection part 223 has a gear structure configured so that a rotation speed of the inner container 210 when the object to be blended is dehydrated is 5 times or more faster than a rotation speed of the inner container 210 when the object to be blended is ground.

As a specific example, the inner container driving connection part 223 has a gear structure configured so that a rotation speed of the inner container 210 when the inner container 210 grinds the object to be blended is 50 rpm to 350 rpm and a rotation speed of the inner container 210 when the inner container 210 dehydrates the object to be blended is 1500 rpm to 3500 rpm.

By such a configuration of the inner container driving connection part 223, the vacuum blender according to the present disclosure may increase a torque as much as possible by decreasing the rotation speed of the inner container 210 when grinding the object to be blended, and maximize a dehydration effect by increasing the rotation speed of the inner container 210 as much as possible when dehydrating the object to be blended.

Figure 6:
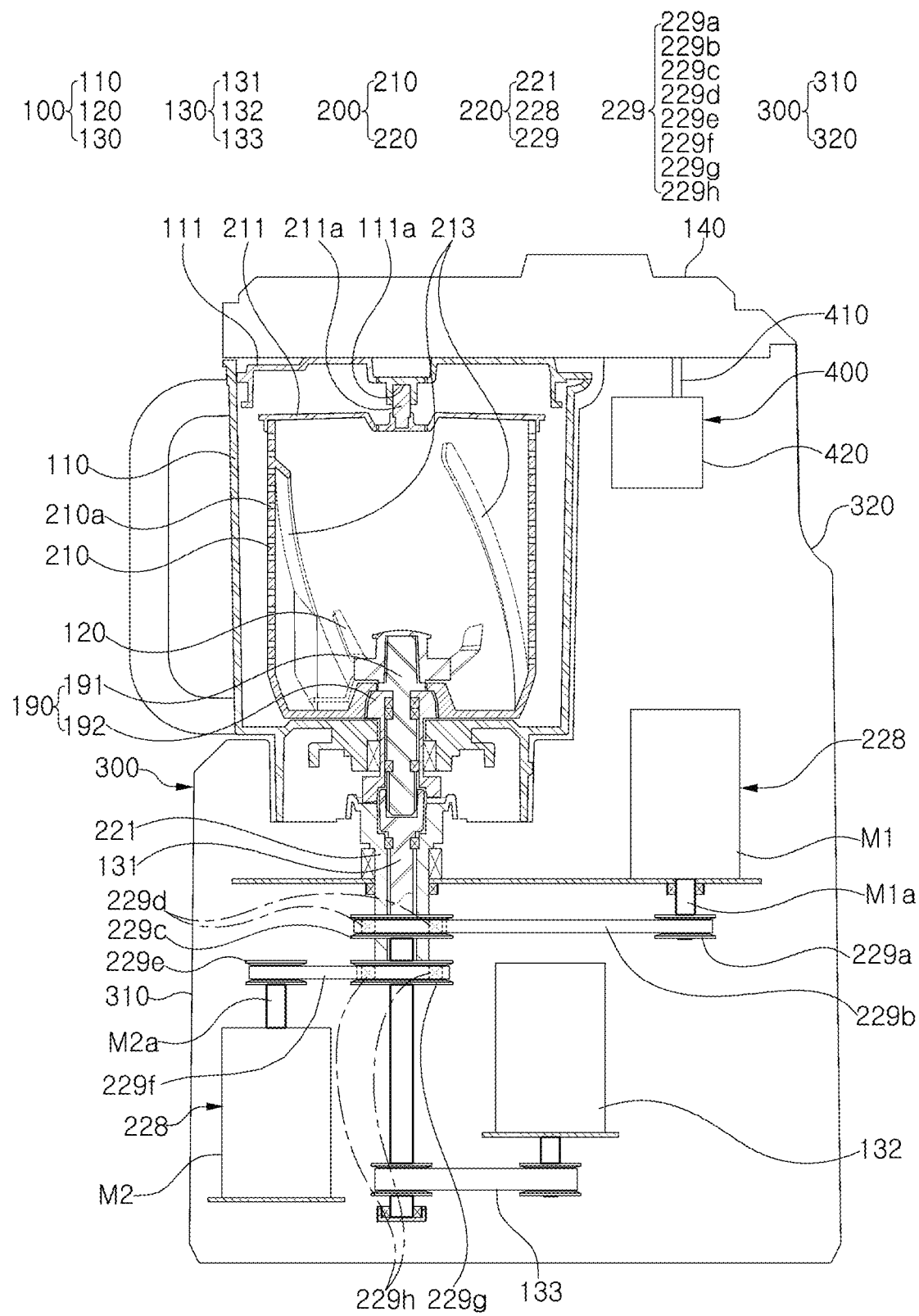
FIG. 6 is a view illustrating an inner portion of a vacuum blender according to another exemplary embodiment in the present disclosure.
Figure 7:
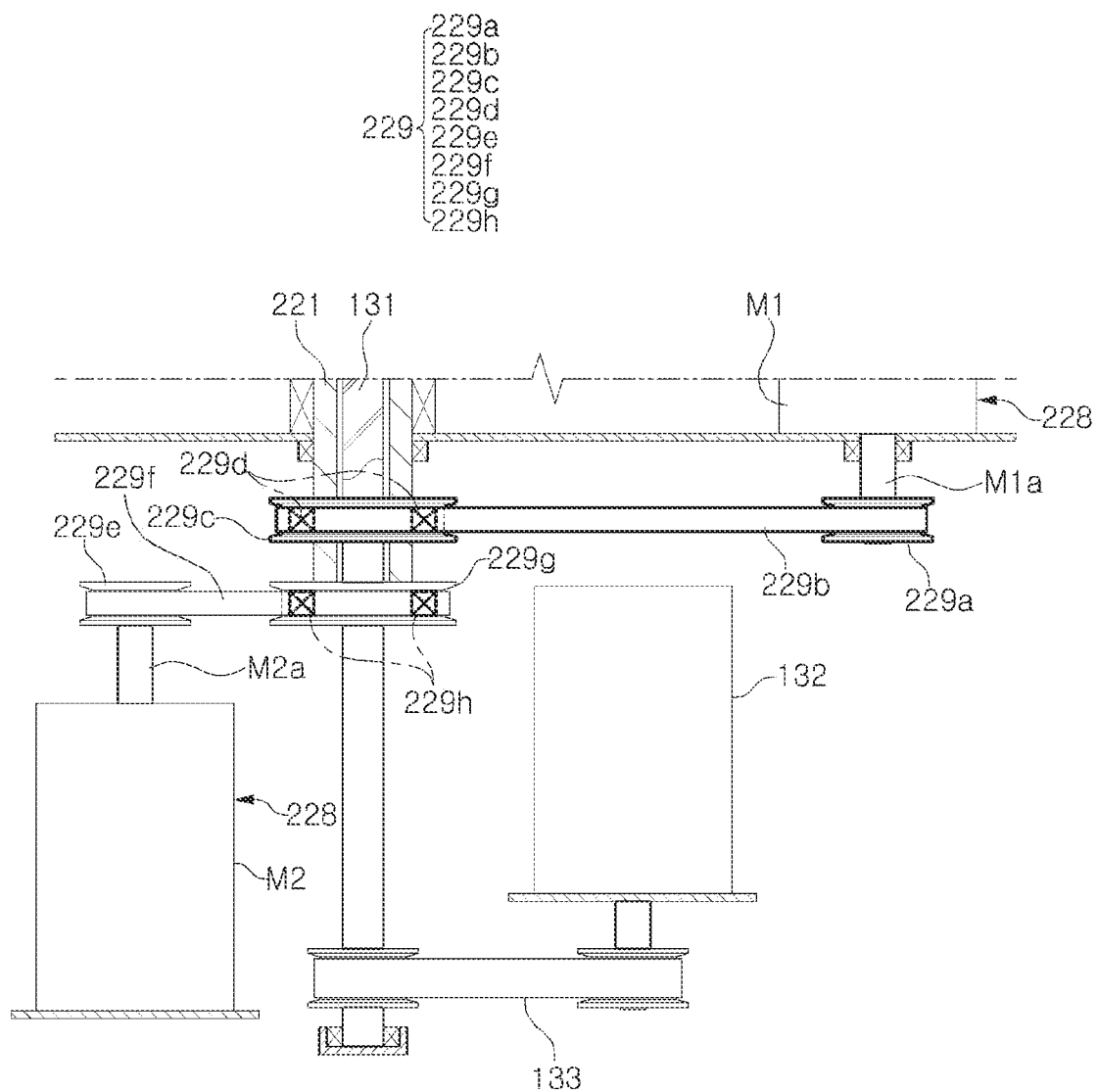
FIGS. 7 and 8 are views illustrating an operation state of an inner container driving unit in the vacuum blender of FIG. 6.
Figure 8:
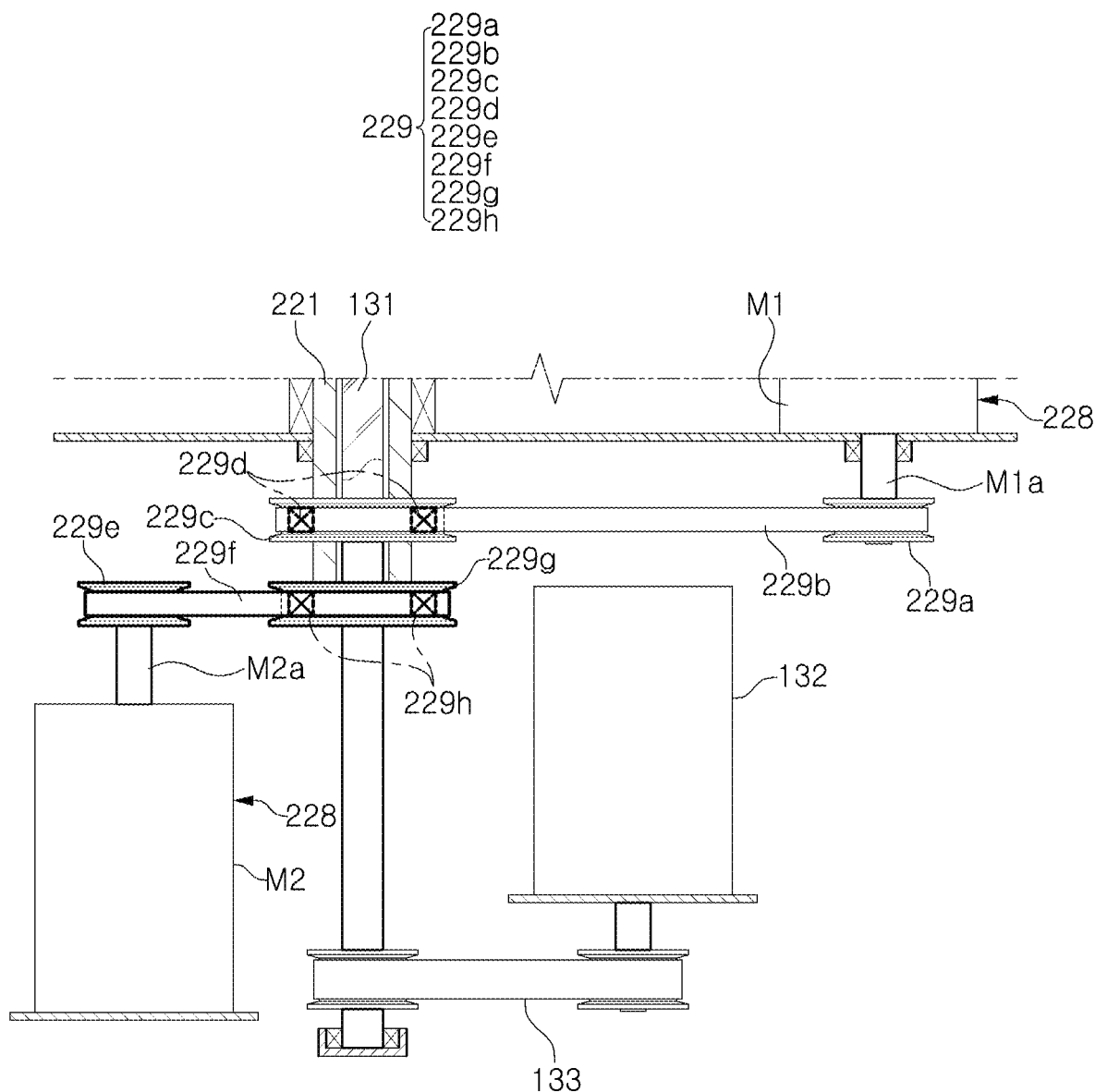

FIG. 6 is a view illustrating an inner portion of a vacuum blender according to another exemplary embodiment in the present disclosure, and FIGS. 7 and 8 are views illustrating an operation state of an inner container driving unit in the vacuum blender of FIG. 6.

Referring to the drawings, the blender body according to another exemplary embodiment in the present disclosure includes a blender body 100, an inner container unit 200, and a vacuum unit 400, and components other than an inner container driving unit 220 of the inner container unit 200 have the same structures as those of the vacuum blender illustrated in FIGS. 4 to 6, and a detailed description thereof will thus be omitted.

In addition, a structure in which the blade rotation shaft 131 of the blade driving unit 130 is axially rotatably installed in a hollow formed in the inner container rotation shaft 221 of the inner container driving unit 220, such that the blade rotation shaft 131 and the inner container rotation shaft 221 axially rotate independently of each other is also the same as the structure described above.

Meanwhile, the inner container driving unit 220 includes the inner container rotation shaft 221, an inner container driving motor 228, and an inner container driving connection part 229 connecting the inner container rotation shaft 221 and the inner container driving motor 228 to each other.

Here, a plurality of inner container driving motors 228 are provided so that the inner container 210 has different rotation speeds when grinding the object to be blended and when dehydrating the object to be blended.

Accordingly, the vacuum blender according to the present disclosure may smoothly reversely rotate objects to be blended close to the inner side surfaces of the inner container 210 among objects to be blended rotating forward by a forward rotation of the grinding blade by decreasing a rotation speed of the inner container 210 using one inner container driving motors 228 to increase a torque when grinding the object to be blended, and may maximize a dehydration effect by increasing a rotation speed of the inner container 210 as much as possible using another inner container driving motors 228 when dehydrating the ground object to be blended as compared with when grinding the object to be blended.

Specifically, one inner container driving motor 228 is a first motor M1 supplying a rotational driving force to the inner container 210 when grinding the object to be blended, and another inner container driving motor 228 is a second motor M2 supplying a rotational driving force to the inner container 210 in an opposite direction to the first motor M1 when dehydrating the ground object to be blended.

In this case, the inner container driving connection part 229 has a structure in which each of the first motor M1 and the second motor M2 and the inner container rotation shaft 221 are connected to each other by a one-way bearing structure.

That is, the first motor M1 and the inner container rotation shaft 221 may be connected to each other by one one-way bearing structure, and the second motor M2 and the inner container rotation shaft 221 may be connected to each other by another one-way bearing structure.

That is, when the object to be blended is ground, the inner container rotation shaft 221 is rotationally driven only by the first motor M1 as illustrated in FIG. 7, and when the object to be blended is dehydrated, the inner container rotation shaft 221 is rotationally driven only by the second motor M2, as illustrated in FIG. 8.

More specifically, the inner container driving connection part 229 has the following structure.

A first driving gear 229a is installed on a first motor shaft M1a of the first motor M1, and a first driven gear 229c gear-fastened to the first driving gear 229a or connected to the first driving gear 229a by a first belt 229b or a first chain is installed on the inner container rotation shaft 221.

That is, the inner container rotation shaft 221 is installed with the first driven gear 229c driving-connected to the first driving gear 229a, and such a first driven gear 229c may be directly gear-fastened to the first driving gear 229a or be connected to the first driving gear 229a by a driving connecting member such as the first belt 229b or the first chain.

Furthermore, although not illustrated in the drawings, a separate intermediate connection shaft may be further installed in a driving connection structure between the first motor shaft M1a and the inner container rotation shaft 221, and a rotation speed and a torque of the inner container rotation shaft 221 may be adjusted through an intermediate connection gear mounted on such an intermediate connection shaft and driving-connected to the first driving gear 229a and the first driven gear 229c.

In addition, a second driving gear 229e is installed on a second motor shaft M2a of the second motor M2, and a second driven gear 229g gear-fastened to the second driving gear 229e or connected to the second driving gear 229e by a second belt 229f or a second chain is installed on the inner container rotation shaft 221.

That is, the inner container rotation shaft 221 is installed with the second driven gear 229g driving-connected to the second driving gear 229e, and such a second driven gear 229g may be directly gear-fastened to the second driving gear 229e or be connected to the second driving gear 229e by a driving connecting member such as the second belt 229f or the second chain.

Furthermore, although not illustrated in the drawings, an intermediate rotation shaft may be further installed as a separate driving transfer medium in a driving connection structure between the second motor shaft M2a and the inner container rotation shaft 221, and a rotation speed and a torque of the inner container rotation shaft 221 may be adjusted through an intermediate connection gear installed on such an intermediate rotation shaft and driving-connected to the second driving gear 229e and the second driven gear 229g.

In addition, a first one-way bearing 229d is mounted between the inner container rotation shaft 221 and the first driven gear 229c.

That is, the inner container rotation shaft 221 penetrates through the first driven gear 229c, and the first one-way bearing 229d has an inner race fixedly fastened to a circumference of the inner container rotation shaft 221 between the inner container rotation shaft 221 and the first driven gear 229c and an outer race fixedly fastened to an inner portion of the first driven gear 229c.

Such a first one-way bearing 229d serves to allow a driving force to be transferred from the first driven gear 229c to the inner container rotation shaft 221 in only one axial rotation direction, and simply axially rotatably fasten the first driven gear 229c and the inner container rotation shaft 221 to each other in an opposite direction so that a driving force is not transferred in the opposite direction.

That is, the first one-way bearing 229d allows the driving force to be transferred from the first driven gear 229c to the inner container rotation shaft 221 so that the inner container rotation shaft 221 also axially rotates in one direction in conjunction with the first driven gear 229c when the first driven gear 229c axially rotates in one direction, and allows the driving force not to be transferred from the inner container rotation shaft 221 to the first driven gear 229c so that the first driven gear 229c does not axially rotate in an opposite direction in conjunction with the inner container rotation shaft 221 when the inner container rotation shaft 221 rotates in the opposite direction.

In addition, a second one-way bearing 229h is mounted between the inner container rotation shaft 221 and the second driven gear 229g.

That is, the inner container rotation shaft 221 penetrates through the second driven gear 229g, and the second one-way bearing 229h has an inner race fixedly fastened to the circumference of the inner container rotation shaft 221 between the inner container rotation shaft 221 and the second driven gear 229g and an outer race fixedly fastened to an inner portion of the second driven gear 229g.

Such a second one-way bearing 229h serves to allow a driving force to be transferred from the second driven gear 229g to the inner container rotation shaft 221 in only one axial rotation direction, and simply axially rotatably fasten the second driven gear 229g and the inner container rotation shaft 221 to each other in an opposite direction so that a driving force is not transferred in the opposite direction.

That is, the second one-way bearing 229h allows the driving force to be transferred from the second driven gear 229g to the inner container rotation shaft 221 so that the inner container rotation shaft 221 also axially rotates in the other direction in conjunction with the second driven gear 229g when the second driven gear 229g axially rotates in the other direction, and allows the driving force not to be transferred from the inner container rotation shaft 221 to the second driven gear 229g so that the second driven gear 229g does not axially rotate in an opposite direction in conjunction with the inner container rotation shaft 221 when the inner container rotation shaft 221 rotates in the opposite direction.

Here, the first one-way bearing 229d and the second one-way bearing 229h have structures in which the driving forces are transferred only in opposite rotation directions.

Accordingly, even though the first driven gear 229c rotates through the first driving gear 229a when only the first motor M1 operates, the second driven gear 229g does not rotate, and ultimately, does not affect the second motor M2, and even though the second driven gear 229g rotates through the second driving gear 229e when only the second motor M2 operates, the first driven gear 229c does not rotate, and ultimately, does not affect the first motor M1.

Meanwhile, the first motor M1, the second motor M2, and the inner container driving connection part 229 may be configured so that a rotation speed of the inner container 210 when the object to be blended is dehydrated is 5 times or more faster than a rotation speed of the inner container 210 when the object to be blended is ground.

As a specific example, the first motor M1, the second motor M2, and the inner container driving connection part 229 are configured so that a rotation speed of the inner container 210 when the inner container 210 grinds the object to be blended is 50 rpm to 350 rpm and a rotation speed of the inner container 210 when the inner container 210 dehydrates the object to be blended is 1500 rpm to 3500 rpm.

By such configurations of the first motor M1, the second motor M2, and the inner container driving connection part 229, the vacuum blender according to the present disclosure may increase a torque as much as possible by decreasing the rotation speed of the inner container 210 when grinding the object to be blended, and maximize a dehydration effect by increasing the rotation speed of the inner container 210 as much as possible when dehydrating the object to be blended.

Meanwhile, the vacuum blender according to the present disclosure may further include a vacuum unit 400 installed in the container support case 300 so as to form a vacuum in the inner container 210, as illustrated in FIGS. 3 and 6.

The vacuum unit 400 may include a suction pipe 410 and a vacuum driving unit 420.

Here, the suction pipe 410 may have a structure in which it extends from the vacuum driving unit 420 embedded in the container support case 300 upward of the outer container 110 through an inner portion of the blender cover 140, and communicates with the inner container 210 disposed in the outer container 110 while communicating with the outer container 110 when the blender cover 140 pivots downward to cover the outer container 110.

In addition, the vacuum driving unit 420 may be connected to the suction pipe 410, and may be formed of a vacuum motor and a vacuum pump.

The vacuum blender of the present disclosure allows a blending operation including the grinding and the dehydration for the object to be blended accommodated in the inner container to be performed under the vacuum by the vacuum unit 400 configured as described above, such that the object to be blended including a fruit or a vegetable is blended in a state in which it is not oxidized, and juice which is fresh and of which a nutritive substance is not destroyed may be obtained.

As described above, the vacuum blender according to the present disclosure has a structure in which the gear fastening structure of the inner container driving connection part 223 varies or the plurality of inner container driving motors 228 are configured so that the inner container 210 has different rotation speeds when grinding the object to be blended and when dehydrating the object to be blended, and thus, the vacuum blender may smoothly reversely rotate the objects to be blended close to the inner side surfaces of the inner container 210 among the objects to be blended rotating forward by the forward rotation of the grinding blade by decreasing the rotation speed of the reverse rotation of the inner container 210 and increasing the torque when grinding the object to be blended, and may maximize the dehydration effect by increasing the rotation speed of the inner container 210 as much as possible when dehydrating the ground object to be blended as compared with when grinding the object to be blended.

The present disclosure has been described with reference to exemplary embodiments and the accompanying drawings, but the present disclosure is not limited thereto, and may be variously modified and altered by those skilled in the art to which the present disclosure pertains without departing from the spirit and scope of the present disclosure claimed in the following claims.

The invention claimed is:

1. A blender comprising:
    a blender body including a container support case, an outer container seated on the container support case, a grinding blade, and a blade driving unit rotating the grinding blade; and
    an inner container unit including an inner container which is disposed in the outer container and in which the grinding blade is positioned, and an inner container driving unit rotating the inner container;
    wherein the outer container is opened and closed by an outer container cover, the inner container is opened and closed by an inner container cover, and the inner container cover is rotatably assembled to the outer container cover,
    a blade rotation shaft of the blade driving unit is installed to be axially rotated in a hollow formed in an inner container rotation shaft of the inner container driving unit, such that the blade rotation shaft and the inner container rotation shaft are axially rotated independently of each other, and an intermediate rotation shaft unit connecting the blade driving unit and the grinding blade to each other and connecting the inner container driving unit and the inner container to each other is installed in the outer container,
    wherein the blade driving unit and the inner container driving unit are mounted in the container support case, and the outer container is detachably connected to the container support case,
    the intermediate rotation shaft unit includes:
    a first intermediate rotation shaft connecting the blade rotation shaft of the blade driving unit and the grinding blade to engage with each other; and
    a second intermediate rotation shaft connecting the inner container rotation shaft of the inner container driving unit and the inner container to engage with each other, and
    the second intermediate rotation shaft and the first intermediate rotation shaft axially rotate independently of each other while the second intermediate rotation shaft surrounds the first intermediate rotation shaft,
    wherein the first intermediate rotation shaft has an upper portion key-fastened to the grinding blade and a lower portion key-fastened to the blade rotation shaft, and
    the second intermediate rotation shaft has an upper portion key-fastened to the inner container and a lower portion key-fastened to the inner container rotation shaft.

2. The blender of claim 1, wherein the first intermediate rotation shaft has first keyways formed in the upper portion thereof, and the grinding blade has lower keys protruding on inner side surfaces of a lower groove formed in the grinding blade and key-fastened to the first keyways, and the first keyway extends downward from an upper end of a side surface of the first intermediate rotation shaft and extends in both side directions at a lower portion thereof.

3. The blender of claim 1, wherein a shaft magnet is embedded in the upper portion of the first intermediate rotation shaft, and a body magnet is embedded in the grinding blade, such that the first intermediate rotation shaft and the grinding blade are attached to each other by magnetic forces of the shaft magnet and the body magnet.

4. The blender of claim 1, wherein a lower hole through which the first intermediate rotation shaft penetrates is formed in the inner container, and a support jaw is formed on an upper edge of the lower hole, and the upper portion of the second intermediate rotation shaft is inserted into the lower hole of the inner container to be assembled while supporting the support jaw of the inner container upward and is key-fastened to inner side surfaces of the lower hole, and the lower portion of the second intermediate rotation shaft is inserted into and assembled to an upper groove of the inner container rotation shaft and is key-fastened to inner side surfaces of the upper groove.

5. The blender of claim 1, wherein the grinding blade and the inner container rotate in opposite directions.

6. The blender of claim 5, wherein the inner container has a protrusion part formed on an inner side surface thereof so that the object to be blended rotationally flowing while being ground by the grinding blade is caught, and the protrusion part has a shape of a screw protrusion line inducing a downward spiral flow of the object to be blended so that the object to be blended flows downward while rotating in a direction opposite to a direction in which the grinding blade rotates.

7. The blender of claim 1, wherein the inner container has a plurality of dehydration holes formed in side portions thereof so that the object to be blended is dehydrated when being rotated.

8. The blender of claim 7, wherein a discharge pipe protruding outwardly is formed at a lower portion of the outer container so that juice dehydrated from the object to be blended is discharged outwardly of the outer container, and a guide protrusion jaw is formed to protrude on one side of a lead portion of the discharge pipe at a lower portion of an inner surface of the outer container so as to block a rotational flow of the juice generated from the object to be blended to allow the juice to be guided to and introduced into the lead portion of the discharge pipe.

9. The blender of claim 1, wherein the blender further comprises a vacuum unit installed in the container support case, including a suction pipe communicated with the inner container and a vacuum driving unit connected to the suction pipe so that a blending operation for an object to be blended accommodated in the inner container is performed in a vacuum state.

* * * * *